Sept. 12, 1933.         L. G. SIMJIAN            1,926,657
                    POSE REFLECTING SYSTEM
                     Filed Sept. 10, 1931

INVENTOR
LUTHER G. SIMJIAN
BY
Herbert H. Thompson
his ATTORNEY.

Patented Sept. 12, 1933

1,926,657

UNITED STATES PATENT OFFICE 1,926,657

POSE REFLECTING SYSTEM

Luther G. Simjian, New Haven, Conn.

Application September 10, 1931
Serial No. 562,064

8 Claims. (Cl. 88—1)

This invention relates to an improvement in pose-reflecting systems for photographic apparatus and particularly to photographic apparatus designed for use in automatic and semi-automatic photographic machines, though not so limited.

The object of this invention is to provide a simple and convenient pose-reflecting system for photographic apparatus which will enable a person being photographed to observe the image the camera will photograph, so that he may be guided in assuming a pose suitable to his tastes.

With this object in view, my invention consists in a pose-reflecting system for photographic apparatus characterized by a rotatable mirror unit normally positioned so that the poser may observe beforehand a reflection of the exact image which the camera will record when the mirror is moved from its normal position to a position in which the image of the poser is reflected into the lens system of the camera. To this end the camera lens system does not point toward the poser but at an angle thereto, such that the poser's image as reflected in the mirror is taken by the camera instead of the direct image.

Referring to the drawing showing one embodiment of my invention,

Figure 1:
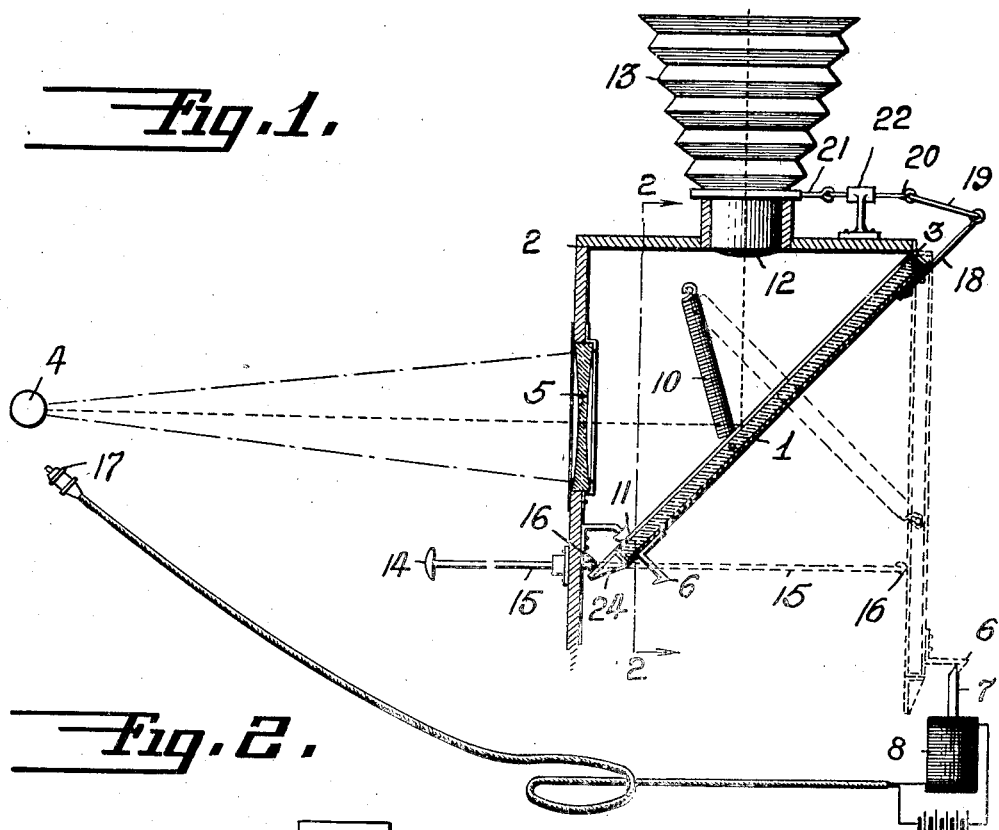
Fig. 1 is a diagrammatic sectional view thereof.
Figure 2:
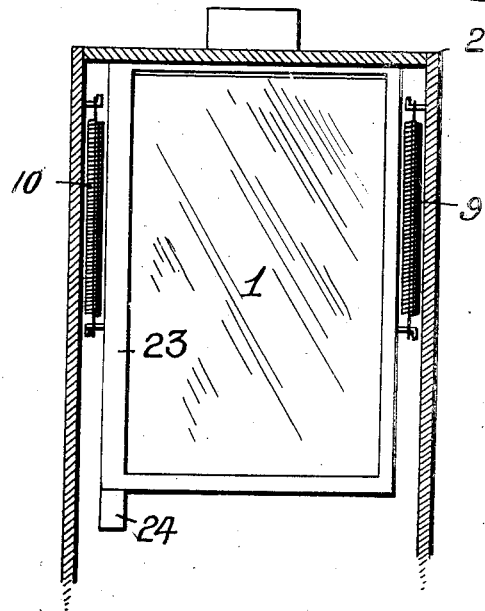
Fig. 2 is a sectional view taken on line 2—2 of Fig. 1 looking in the direction of the arrows at a time when the mirror is folded back into its normal position as shown in dotted lines in Fig. 1.

In carrying out my invention I employ a rectangular mirror unit 1 pivoted at 3 to the framework or box-like structure 2. When the mirror is in the dotted line position shown, it reflects the image of an observer or poser at 4 as the image is received from the reducing lens 5. Owing to the intervention of the reducing lens, the reflection which is seen by the poser is reduced in size to an extent that it may readily be taken in at a glance by the observer and appears of a size comparable with the size of the picture when completed. The mirror is normally held in this position by latch 6 on the back thereof which is shown as engaging a locking member or bolt 7 which may form the armature of a solenoid 8. The lock is normally forced upwardly by a spring (not shown). When the solenoid is excited, the lock 7 is withdrawn and the mirror is rotated forwardly to the full line position shown, by one or more tension springs 9—10. In this position the mirror rests against a cushioned stop 11 and is in the correct position to reflect an image of a poser directly into the objective lens 12 of the camera 13. Therefore, if the camera shutter be operated with the mirror in this position, a photograph of the poser will be taken. The camera, however, is not visible to the poser prior to the actual taking of the picture.

In order to reset the mirror for the next operation, I show a knob 14 on a long stem 15 having a roller or rollers 16 on the inner end thereof so that by pushing in on the knob the mirror is rotated backwardly against the tension of the springs 9—10 to again catch the latch 6 on the bolt 7. The poser himself may press the switch 17 for operating the solenoid and also the resetting button 14. Roller 16 may engage one side of the mirror frame 23, on which an extension 24 is provided, so that the roller will not leave the edge of the frame when the mirror is in the full line position.

Preferably also I provide means for automatically operating the shutter of the camera at the time the mirror is moved in to photographing position. For this purpose I have shown a bar 18 on the back of the mirror connected by links 19—20 to the shutter operating lever 21 on the camera. Link 20 is shown as guided for reciprocation in bushing 22. As the mirror is snapped forward the links are drawn to the right thus operating the shutter. It will readily be understood that sufficient lost motion may be provided in the linkage or connection to the shutter so that the shutter is not operated until the mirror is at the proper angle which is in this instance 45°. By this means the poser may secure the proper pose and facial expression desired and take his own photograph without assistance from the photographer.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a pose-reflecting system for photographic apparatus, the combination with a camera and the lens system thereof, of a rotatable mirror unit adjacent said camera, a lock for normally holding said mirror normally turned to one side of said camera to reflect the image of the poser positioned at an angle to the camera lens system, spring means tending to turn said mirror through an angle sufficient to reflect said image into said camera lens system and means for releasing said lock when it is desired to take the picture.

2. In a pose-reflecting system for photographic apparatus, the combination with a camera and the lens system thereof, of a rotatable mirror unit normally turned to one side of said camera lens system and adapted to reflect the image of the poser positioned at an angle to the camera lens system, and means operable by the poser for successively turning said mirror and opening the camera shutter to take the poser's picture as reflected in the mirror and as previously observed by the poser.

3. In a pose-reflecting system for photographic apparatus, the combination with a camera and the lens system thereof, of a rotatable mirror unit normally turned to one side of said camera and adapted to reflect the image of the poser positioned at an angle to the camera lens system, an image reducing lens located in front of said mirror whereby a person to be photographed may, beforehand, observe in the said mirror a reduced-scale reflection of the image which the said camera will record when the said mirror is moved from its said normal position, and means for turning said mirror through an angle sufficient to reflect said image into said camera lens system.

4. In a pose-reflecting system for photographic apparatus, the combination with a camera and the lens system thereof, of a rotatable mirror unit normally turned to one side of said camera and adapted to reflect the image of the poser positioned at an angle to the camera lens system, means for turning said mirror through an angle sufficient to reflect said image into said camera lens system, and means operable by the turning of the mirror to open the camera shutter.

5. In a pose-reflecting system for photographic apparatus, the combination with a camera and the lens system thereof, of a rotatable mirror unit normally turned to one side of said camera and adapted to reflect the image of the poser positioned at an angle to the camera lens system, means for turning said mirror through an angle sufficient to reflect said image into said camera lens system, and means for resetting the mirror, both of said means being operable by the poser.

6. In a pose-reflecting system for photographic apparatus, the combination with a camera and the lens system thereof, of a rotatable mirror unit normally turned to one side of said camera and adapted to reflect the image of the poser positioned at an angle to the camera lens system, means for turning said mirror through an angle sufficient to reflect said image into said camera lens system, and a mechanical connection including a lost motion device between said mirror and the camera shutter to open the latter as the mirror reaches the proper angle to take a picture.

7. In a pose-reflecting system for photographic apparatus, the combination with a camera and the lens system thereof, of a rotatable mirror unit adjacent said camera, a lock for normally holding said mirror normally turned to one side of said camera to reflect the image of the poser positioned at an angle to the camera lens system, spring means tending to turn said mirror through an angle sufficient to reflect said image into said camera lens system, means for releasing said lock when it is desired to take the picture, and means for opening the camera shutter as the mirror reaches the proper angle to reflect the poser's image into the camera.

8. In a pose-reflecting system for photographic apparatus, the combination with a camera and the lens system thereof, of a rotatable mirror unit normally turned to one side of said camera and adapted to reflect the image of the poser positioned at an angle to the camera lens system, an image reducing lens located in front of said mirror whereby a person to be photographed may beforehand observe in said mirror a reduced scale reflection of the image which said camera will record when the mirror is moved from said normal position, means for turning said mirror through an angle sufficient to reflect said image into said camera lens system, and means for resetting the mirror, both of said means being operable by the poser.

LUTHER G. SIMJIAN.